United States Patent
Gokan et al.

(10) Patent No.: US 8,302,752 B2
(45) Date of Patent: Nov. 6, 2012

(54) MULTI-PLATE CLUTCH

(75) Inventors: Yoshitsugu Gokan, Saitama (JP);
Takafumi Asakura, Saitama (JP);
Hirotaka Kawatsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 659 days.

(21) Appl. No.: 12/586,061

(22) Filed: Sep. 16, 2009

(65) Prior Publication Data

US 2010/0078286 A1   Apr. 1, 2010

(30) Foreign Application Priority Data

Sep. 30, 2008 (JP) ................... 2008-255160

(51) Int. Cl.
*F16D 13/52* (2006.01)
*F16D 13/54* (2006.01)
*F16D 43/20* (2006.01)

(52) U.S. Cl. .............. 192/54.5; 192/56.6; 192/70.23; 192/93 A

(58) Field of Classification Search ............ 192/54.5, 192/56.6, 70.23, 93 A, 109 R
See application file for complete search history.

(56) References Cited

U.S. PATENT DOCUMENTS

| 2009/0078526 A1 * | 3/2009 | Kawatsu et al. | ........ | 192/70.23 |
| 2010/0078285 A1 | 4/2010 | Gokan et al. | | |
| 2011/0024256 A1 * | 2/2011 | Gokan et al. | ................ | 192/89.2 |
| 2011/0073429 A1 * | 3/2011 | Gokan et al. | ................ | 192/54.5 |
| 2011/0073432 A1 * | 3/2011 | Gokan et al. | ............... | 192/70.12 |

FOREIGN PATENT DOCUMENTS

| JP | 2008-038954 | | 2/2008 |
| JP | 200839082 A | * | 2/2008 |
| JP | 2 169 247 A2 | | 3/2010 |

* cited by examiner

*Primary Examiner* — David D Le
*Assistant Examiner* — Huan Le
(74) *Attorney, Agent, or Firm* — Carrier Blackman & Associates, P.C.; Joseph P. Carrier; William D. Blackman

(57) ABSTRACT

A multi-plate clutch includes a clutch inner member, having a cylindrical portion and a pressure-applying plate portion, and a pressure-receiving plate opposite the pressure-applying plate portion with plural driving and driven friction plates interposed therebetween. The multi-plate clutch also includes a center cam having a disc portion, an assist cam and a slipper cam disposed on the disc portion. The assist and slipper cams include identical material, and have substantially identical shapes. An outer circumference of the assist cam is splined to an inner circumference of the cylindrical portion of the clutch inner member, so the assist cam can move in the axial direction relative to the clutch inner member. An outer circumference of the slipper cam is splined to the inner circumference of the cylindrical portion, so that axial motion of the slipper cam, relative to the clutch inner member away from the disc portion, is limited.

20 Claims, 4 Drawing Sheets

MULTI-PLATE CLUTCH

CROSS-REFERENCE TO RELATED APPLICATIONS

The present invention claims priority under 35 USC 119 based on Japanese patent application No. 2008-255160, filed on Sep. 30, 2008. The entire subject matter of this priority document, including specification claims and drawings thereof, is incorporated by reference herein.

BACKGROUND OF THE INVENTION

1. Field of the Invention

The present invention relates to a multi-plate clutch, including a clutch outer member, a clutch inner member, a pressure-receiving plate, a center cam, an assist cam, and a slipper cam which is substantially identical to the assist cam. More particularly, the present invention relates to a multi-plate clutch which is characterized in that the clutch outer member is connected to an input member, the clutch inner member includes a cylindrical portion coaxially disposed in the clutch outer member, and a pressure-applying plate portion provided integrally with one end of the cylindrical portion, and the pressure-receiving plate fixed to an output member. Further, the present invention is characterized in that a plurality of driving friction plates engaged with the clutch outer member so as not to rotate relative thereto, and a plurality of driven friction plates engaged with the clutch inner member so as not to rotate relative thereto are interposed between the pressure-receiving plate and the pressure-applying plate portion, the center cam has a disc portion disposed in a plane orthogonal to a rotation axis of the output member, and is disposed inward in a radial direction of the cylindrical portion and fixed to the output member, the assist cam is arranged opposite to one surface of the disc portion, and is operable to move the pressure-applying plate portion toward the pressure-receiving plate based on an increase in driving force inputted from the input member, and the slipper cam is arranged opposite to the other surface of the disc portion, and is operable to move the pressure-applying plate portion away from the pressure-receiving plate based on an increase in back torque from the output member.

2. Description of the Background Art

There is a known multi-plate clutch in which an assist cam, a slipper cam, and a clutch inner member are fastened together with multiple bolts. An example such multi-plate clutch is disclosed in the Japanese Patent Application Publication No. 2008-38954.

The assist cam is arranged opposite to one surface of a center cam fixed to an output member, and thus constitutes an assist cam mechanism by cooperating with the center cam. The slipper cam is arranged opposite to the other surface of the center cam, and thus constitutes a torque limiter mechanism by cooperating with the center cam.

However, in the multi-plate clutch as disclosed in the Japanese Patent Application Publication No. 2008-38954, in order to ensure strength sufficient to withstand torques generated in the assist cam mechanism and the back torque limiter mechanism, it is necessary to use high-strength bolts or increase the number of bolts. This may cause increase in the cost, and increase in weight of bolts.

The present invention has been made to overcome such drawbacks of the existing multi-plate clutch. Accordingly, it is one of the objects of the present invention to provide a multi-plate clutch in which torques can be transmitted from an assist cam and a slipper cam to a clutch inner member without using bolts, and in which the number of components of the multi-plate clutch, and the cost are reduced, and which has a low weight.

SUMMARY OF THE INVENTION

In order to achieve the above objects, the present invention according to a first aspect thereof provides a multi-plate clutch. The multi-plate clutch mainly includes a clutch outer member, a clutch inner member, a pressure-receiving plate, a center cam, an assist cam, and a slipper cam.

The clutch outer member is connected to an input member. The clutch inner member has a cylindrical portion and a pressure-applying plate portion. The cylindrical portion is coaxially disposed in the clutch outer member, and the pressure-applying plate portion is provided integrally with one end of the cylindrical portion. The pressure-receiving plate is fixed to an output member.

A plurality of driving friction plates engaged with the clutch outer member so as not to rotate relative thereto, and a plurality of driven friction plates engaged with the clutch inner member so as not to rotate relative thereto are interposed between the pressure-receiving plate and the pressure-applying plate portion.

The center cam has a disc portion disposed in a plane orthogonal to a rotation axis of the output member, and is disposed inward in a radial direction of the cylindrical portion and fixed to the output member. The assist cam is disposed opposite to one surface of the disc portion, and is operable to move the pressure-applying plate portion toward the pressure-receiving plate based on an increase in driving force inputted from the input member.

The slipper cam is arranged opposite to other surface of the disc portion, and is operable to move the pressure-applying plate portion away from the pressure-receiving plate based on an increase in back torque from the output member.

The assist cam and the slipper cam are formed of an identical material and each have a substantially identical shape, and also size. An outer circumference of the assist cam is splined to an inner circumference of the cylindrical portion of the clutch inner member so that the assist cam is operable to move in an axial direction relative to the clutch inner member. An outer circumference of the slipper cam is splined to the inner circumference of the cylindrical portion of the clutch inner member so that at least an axial motion of the slipper cam relative to the clutch inner member away from the disc portion is limited.

The present invention according to a second aspect thereof, in addition to the first aspect, is characterized in that the multi-plate clutch further includes a stopper formed integrally with the clutch inner member. The stopper limits the axial motion of the slipper cam relative to the clutch inner member away from the disc portion of the center cam.

The present invention according to a third aspect thereof, in addition to the first aspect, is characterized in that the outer circumference of the slipper cam is press-fitted to the inner circumference of the cylindrical portion of the clutch inner member while being splined thereto.

The present invention according to a fourth aspect thereof, in addition to the first aspect, is characterized in that the multi-plate clutch further includes a collar member having an outer circumference thereof splined to the inner circumference of the cylindrical portion of the clutch inner member. The collar member is interposed between the assist cam and the slipper cam so as to surround the center cam such that a minimum distance between the assist cam and the slipper cam is limited.

The present invention according to a fifth aspect thereof, in addition to one of the first through fourth aspects, is characterized in that the assist cam and the slipper cam have protrusions respectively inserted into recesses provided in both surfaces of the disc portion of the center cam, and in which both sides of each of the protrusions are formed at angles so as to come into contact with side surfaces of a corresponding one of the recesses.

A main shaft 11 of an illustrative embodiment corresponds to the output member of the present invention, and a primary driven gear 16 of the illustrative embodiment corresponds to the input member of the present invention.

EFFECTS OF THE INVENTION

According to the first through fifth aspects of the present invention, the outer circumference of the assist cam is splined to the inner circumference of the cylindrical portion of the clutch inner member so as to move in the axial direction relative to the clutch inner member. The outer circumference of the slipper cam is splined to the inner circumference of the cylindrical portion so that at least the axial motion of the slipper cam relative to the clutch inner member away from the disc portion of the center cam is limited.

Accordingly, the assist cam and the slipper cam can be connected to the clutch inner member without bolts so as not to rotate relative to the clutch inner member. Thus, the number of components and the cost can be reduced by avoiding use of bolts, and the weight of the multi-plate clutch can be reduced.

Further, the assist cam and the slipper cam are formed of the identical material in the substantially identical shape and size. Accordingly, the cost can be further reduced by using the same or similar components as both the assist cam and the slipper cam.

In particular, according to the second aspect of the present invention, the stopper formed integrally (monolithically) with the clutch inner member limits the axial motion of the slipper cam relative to the clutch inner member away from the center cam. Accordingly, the axial motion of the slipper cam can be limited without increasing the number of parts.

Also, according to the third aspect of the present invention, the outer circumference of the slipper cam is press-fitted to the inner circumference of the cylindrical portion of the clutch inner member while being splined thereto. Accordingly, the slipper cam can be fixed to the clutch inner member without increasing the number of components.

Moreover, according to the fourth aspect of the present invention, the outer circumference of the collar member, which is interposed between the assist cam and the slipper cam, is splined to the inner circumference of the cylindrical portion of the clutch inner member. Accordingly, efficiency of assembling the multi-plate clutch can be improved by assembling splining the assist cam, the collar member, and the slipper cam to the cylindrical portion of the clutch inner member in order.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. Where a series of three dots ( . . . ) are used after reference numbers herein, a plurality of the referenced components are indicated. It should be understood that these terms are used for purposes of illustration, and are not intended to limit the invention.

Hereinafter, embodiments of the present invention will be described with reference to the accompanying drawings.

Figure 1:
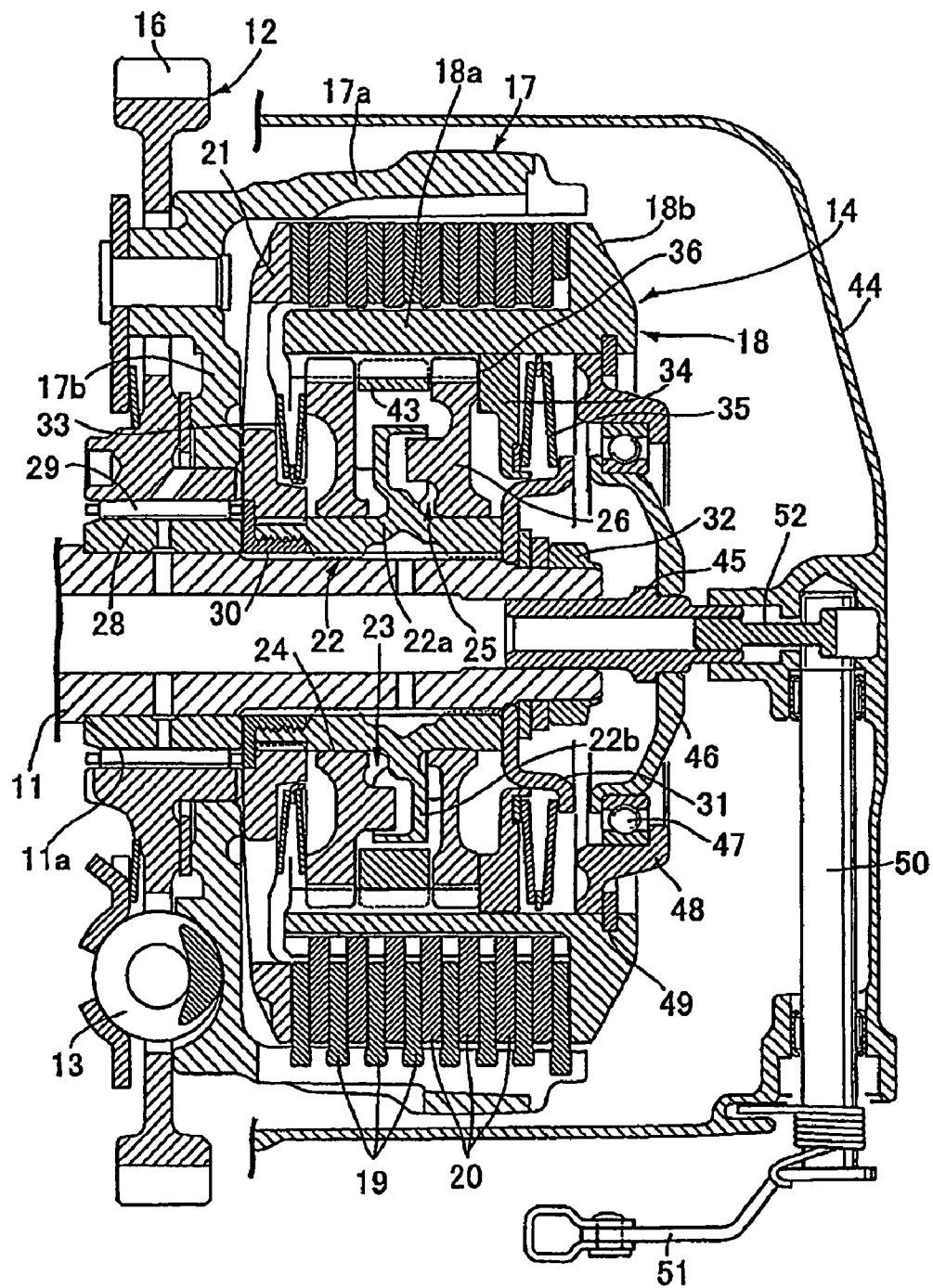
FIG. 1 is a cross-sectional view of a multi-plate clutch according a first illustrative embodiment of the present invention.
Figure 2:
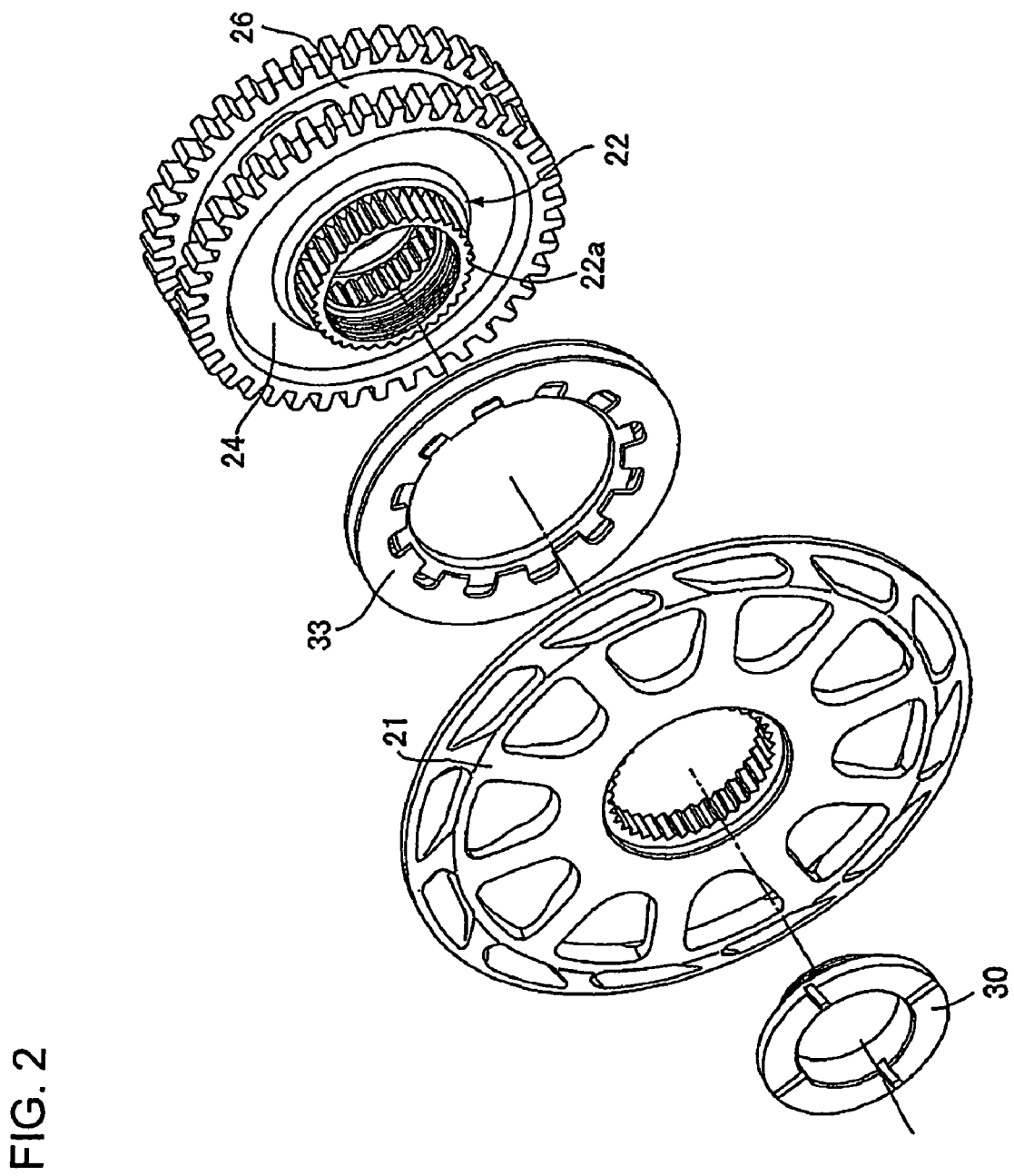
FIG. 2 is an exploded perspective view of a center cam, an assist cam, a slipper cam, a disc spring, a pressure-receiving plate, and a nut of the multi-plate clutch according a first illustrative embodiment of the present invention.
Figure 3:
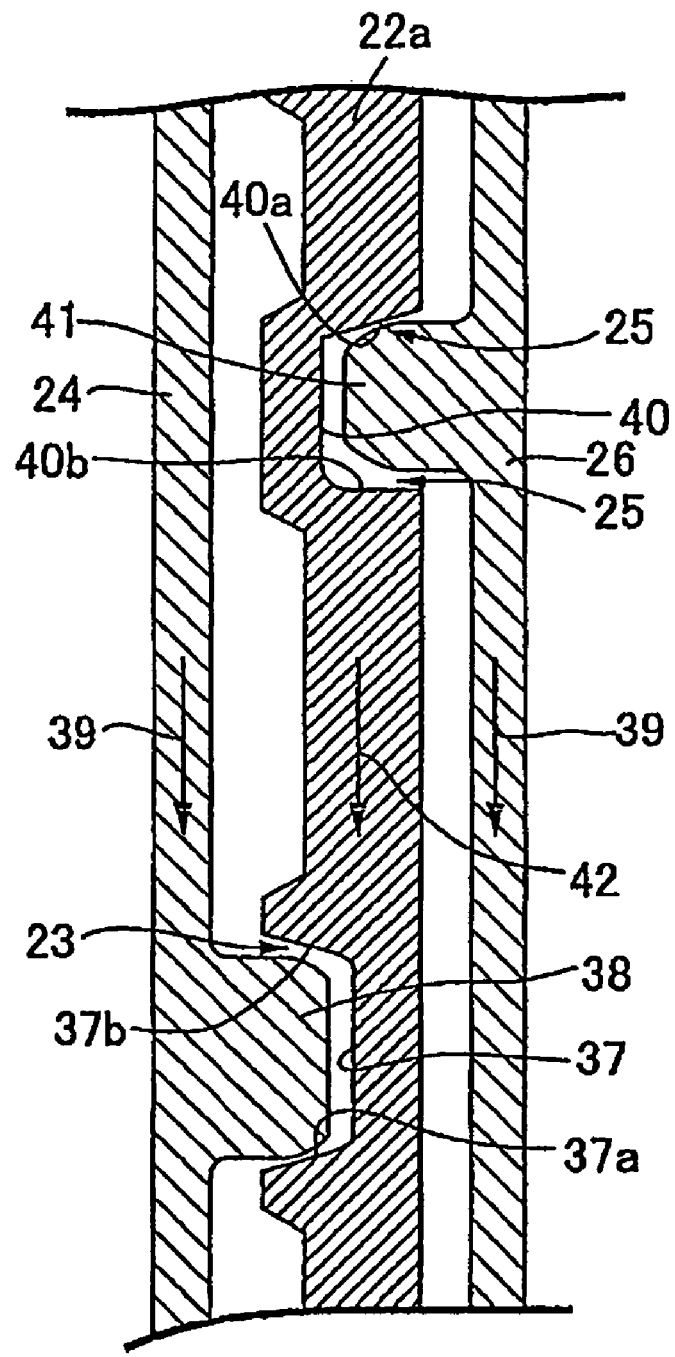
FIG. 3 is a circumferentially-developed cross-sectional view showing portion of an assist cam mechanism and a back torque limiter mechanism.

FIGS. 1 through 3 show a first illustrative embodiment of the present invention. FIG. 1 is a cross-sectional view of a multi-plate clutch. FIG. 2 is an exploded perspective view of a center cam, an assist cam, a slipper cam, a disc spring, a pressure-receiving plate, and a nut of the multi-plate clutch according a first illustrative embodiment of the present invention. FIG. 3 is a circumferentially-developed cross-sectional view showing portion of an assist cam mechanism and a back torque limiter mechanism.

As shown in FIG. 1, a primary speed reducer 12, a damper spring 13, and a multi-plate clutch 14 are disposed between a crankshaft (not shown) of an engine mounted on, for example, a motorcycle, and a main shaft 11 of a gearbox (not shown). The primary speed reducer 12 includes a primary drive gear (not shown) disposed on the crankshaft and a primary driven gear 16 gearing with the primary drive gear. The primary driven gear 16 is movably supported by the main shaft 11 so as to rotate relative thereto.

The multi-plate clutch 14 includes a clutch outer member 17 connected to the primary driven gear 16, serving as an input member, with the damper spring 13 interposed therebetween; a clutch inner member 18 having a cylindrical portion 18a coaxially disposed in the clutch outer member 17, and a pressure-applying plate portion 18b provided integrally with one end of the cylindrical portion 18a; multiple driving friction plates 19, 19 . . . engaged with the clutch outer member 17 so as not to rotate relative thereto; multiple driven friction plates 20, 20 . . . disposed alternately with the driving friction plates 19, 19 . . . and engaged with the cylindrical portion 18a of the clutch inner member 18 so as not to rotate relative thereto; a pressure-receiving plate 21 fixed to the main shaft 11, serving as an output member, and arranged opposed to the pressure-applying plate portion 18b with the alternately disposed driving and driven friction plates 19, 19 . . . and 20, 20 . . . interposed therebetween; a center cam 22 disposed inward of the cylindrical portion 18a in a radial direction thereof and fixed to the main shaft 11; an assist cam 24 arranged opposite to one surface of the center cam 22 so as not to rotate relative to the clutch inner member 18; and a slipper cam 26 arranged opposite to the other surface of the center cam 22 so as not to rotate relative to the clutch inner member 18.

The clutch outer member 17 integrally includes a cylindrical portion 17a coaxially surrounding the cylindrical portion 18a of the clutch inner member 18; and an end wall portion 17b formed continuous with an end of the cylindrical portion 17a on the primary driven gear 16 side. The clutch outer member 17 is formed in the shape of a bowl open to the side opposite to the primary driven gear 16. The outer circumferences of the multiple driving friction plates 19, 19 . . . are engaged with the cylindrical portion 17a so as to move in the axial direction but not to rotate relative thereto.

The clutch inner member 18 is formed by casting to integrally include the cylindrical portion 18a and the pressure-applying plate portion 18b continuous with one end of the cylindrical portion 18a so as to extend outward in the radial direction.

An annular step portion 11a open to the multi-plate clutch 14 side is formed in a portion (corresponding to the primary speed reducer 12) of the outer circumference of the main shaft 11. On the side opposite to the multi-plate clutch 14, an end portion of a cylindrical sleeve 28 fitted to the outer circumference of the main shaft 11 is in contact with the annular step portion 11a. A needle bearing 29 is disposed between the outer circumference of the sleeve 28 and the inner circumference of the primary driven gear 16.

As shown in FIGS. 1 and 2, the center cam 22 integrally includes a cylindrical boss portion 22a splined to the outer circumference of the main shaft 11, and a disc portion 22b which extends outward in the radial direction from the middle portion of the boss portion 22a with respect to the axial direction and which is disposed in a plane orthogonal to the axial direction of the main shaft 11.

On the other hand, the pressure-receiving plate 21 is formed in a disc-like shape. The inner circumference of the pressure-receiving plate 21 is splined to the outer circumference of an end of the boss portion 22a on the primary speed reducer 12 side, and is fixed to the boss portion 22a by being held between the boss portion 22a and a bolt 30 screwed in the end of the boss portion 22a on the primary speed reducer 12 side. The sleeve 28 is interposed between the annular step portion 11a and the bolt 30.

A nut 32 is screwed to one end of the main shaft 11, which is arranged opposed to one end of the boss portion 22a of the center cam 22 with an annular spring retainer 31 interposed therebetween. Screwing the nut 32 causes the bolt 30, the boss portion 22a of the center cam 22, and the spring retainer 31 to be held between the annular step portion 11a and the nut 32. Since the boss portion 22a is splined to the outer circumference of the main shaft 11, the center cam 22 and the pressure-receiving plate 21 are fixed to the main shaft 11.

The assist cam 24 cooperates with the center cam 22 to constitute an assist cam mechanism 23 which moves the clutch inner member 18 in accordance with an increase in driving force inputted from the primary driven gear 16 in such a direction that the pressure-applying plate portion 18b moves toward the pressure-receiving plate 21.

The slipper cam 26 cooperates with the center cam 22 to constitute a back torque limiter mechanism 25 which moves the clutch inner member 18 in accordance with an increase in back torque from the main shaft 11 in such a direction that the pressure-applying plate portion 18b moves away from the pressure-receiving plate 21.

The outer circumferences of the assist cam 24 and the slipper cam 26, at which inner circumferences the assist cam 24 and the slipper cam 26 are movably supported by the boss portion 22a of the center cam 22 with the disc portion 22b of the center cam 22 interposed therebetween, are splined to the inner circumference of the cylindrical portion 18a of the clutch inner member 18 so as to move in the axial direction relative to the clutch inner member 18.

Further, the assist cam 24 is splined to the cylindrical portion 18a of the clutch inner member 18 in a space between the disc portion 22b of the center cam 22 and the pressure-receiving plate 21. A disc spring 33 is interposed between the assist cam 24 and the pressure-receiving plate 21. The disc spring 33 biases the assist cam 24 toward the disc portion 22b of the center cam 22.

On the other hand, the slipper cam 26 is splined to the cylindrical portion 18a of the clutch inner member 18 in a space between the disc portion 22b of the center cam 22 and an annular spring retainer 34 fitted into the cylindrical portion 18a of the clutch inner member 18 so as to slide. A clutch spring 35, which is a disc spring, is disposed between the spring retainer 31 fixed to the main shaft 11 and the spring retainer 34.

The clutch spring 35 is disposed on the inner circumference of the cylindrical portion 18a, and is operable to press the spring retainer 34 against an annular step portion 36 which receives the spring retainer 34 from the side opposite to the clutch spring 35. The clutch inner member 18 is biased by the clutch spring 35 in such a direction that the pressure-applying plate portion 18b is moved toward the pressure-receiving plate 21, i.e., in such a direction that the driving and driven friction plates 19, 19 . . . and 20, 20 . . . are frictionally engaged with each other to bring the multi-plate clutch 14 into a connected state.

The axial motion of the slipper cam 26 relative to the clutch inner member 18 away from the disc portion 22b of the center cam 22 is limited by the spring retainer 34, which is a stopper member.

As shown in FIG. 3, multiple protrusions 38 . . . protruding from the assist cam 24 are respectively inserted into multiple recesses 37 . . . provided in one surface of the disc portion 22b of the center cam 22, thus forming the assist cam mechanism 23. In a situation where power is being transmitted from the primary driven gear 16 to the main shaft 11 through the multi-plate clutch 14 in an operatively connected state, when the rotation direction of the clutch inner member 18 is the direction indicated by arrows 39 in FIG. 3, first tilted contact surfaces 37a . . . are formed on front side surfaces of the recesses 37 . . . with respect to the rotation direction 39 of the clutch inner member 18.

The first tilted contact surfaces 37a . . . are tilted toward the assist cam 24 so as to be positioned forward with respect to the rotation direction 39. Meanwhile, second tilted contact surfaces 37b . . . are formed on back side surfaces of the recesses 37 . . . with respect to the rotation direction 39. The second tilted contact surfaces 37b . . . are tilted toward the assist cam 24 so as to be positioned backward with respect to the rotation direction 39.

When a change in torque due to acceleration occurs when the torque is being transmitted between the primary driven gear 16 and the main shaft 11, the protrusions 38 . . . of the assist cam 24 come into contact with the first tilted contact surfaces 37a . . . of the recesses 37 . . . in the disc portion 22b of the center cam 22. A force is applied to the assist cam 24 from the disc portion 22b of the center cam 22 in such a direction that the assist cam 24 is moved away from the disc portion 22b.

This weakens the biasing force of the disc spring 33 which acts in a direction opposite to, and cancels the biasing force of the clutch spring 35. Accordingly, the clutch spring 35 completely exerts the biasing force thereof, and strengthens the compressive force of the driving and driven friction plates 19, 19 . . . and 20, 20 . . . by causing the clutch spring 35.

Multiple protrusions 41 ... protruding from the slipper cam 26 are respectively inserted into multiple recesses 40 ... provided in the other surface of the disc portion 22b of the center cam 22, thus forming the back torque limiter mechanism 25. In a situation where a change in torque due to deceleration occurs with the multi-plate clutch 14 in a connected state, when the rotation direction of the center cam 22 is the direction indicated by an arrow 42, third tilted contact surfaces 40a ... are formed on back side surfaces of the recesses 40 ... with respect to the rotation direction 42 of the center cam 22.

The third tilted contact surfaces 40a ... are tilted toward the slipper cam 26 to be positioned backward with respect to the rotation direction 42. Meanwhile, fourth tilted contact surfaces 40b ... are formed on front side surfaces of the recesses 40 ... with respect to the rotation direction 42. The fourth tilted contact surfaces 40b ... are tilted toward the slipper cam 26 so as to be positioned forward with respect to the rotation direction 42.

When a change in torque due to deceleration occurs in a state in which a torque is being transmitted between the primary driven gear 16 and the main shaft 11, the third tilted contact surfaces 40a ... of the recesses 40 ... in the disc portion 22b of the center cam 22 come into contact with the protrusions 41 ... of the slipper cam 26. A force is applied to the slipper cam 26 from the disc portion 22b of the center cam 22 in such a direction that the slipper cam 26 is moved away from the disc portion 22b. This weakens the biasing force of the clutch spring 35, and weakens the compressive force of the driving and driven friction plates 19, 19 ... and 20, 20 ....

The assist cam 24 and the slipper cam 26 are formed of an identical material and have substantially identical shape and size. Also, the protrusions 38 of the assist cam 24 and the protrusions 41 of the slipper cam 26 have identical shapes. Further, the recesses 37 provided in one surface of the disc portion 22b of the center cam 22 and the recesses 40 provided in the other surface of the disc portion 22b have identical shapes.

The outer circumference of a collar member 43 disposed between the assist cam 24 and the slipper cam 26 to surround the disc portion 22b of the center cam 22 is splined to limit the minimum distance between the assist cam 24 and the slipper cam 26. The slipper cam 26 is splined to the inner circumference of the cylindrical portion 18a of the clutch inner member 18.

The multi-plate clutch 14 is covered with an engine cover 44 of an engine (not shown). An actuating shaft 45 has one end thereof fitted to the engine cover 44 so as to move in the axial direction, and the other end coaxially fitted to the main shaft 11 so as to slide. A bearing holder 46 is fixed to a middle portion of the actuating shaft 45. The outer circumference of a lifter 48 adjacent to the bearing holder 46 with a clutch bearing 47 interposed therebetween is fitted to one end of the cylindrical portion 18a of the clutch inner member 18. A retaining ring 49 is attached to the inner circumference of the one end of the cylindrical portion 18a of the clutch inner member 18. The retaining ring 49 is in contact with the outer circumference of the lifter 48 on the side opposite from the clutch spring 34.

An operating shaft 50 which switches the multi-plate clutch 14 between a connected state and a disconnected state is rotatably supported by the engine cover 44. A lever 51 is disposed on an end of the operating shaft 50, which is protruded from the engine cover 44. One end of a transmission shaft 52 which is operable to move in the axial direction in accordance with the rotation of the operating shaft 50 is engaged with the inner end of the operating shaft 50. The other end of the transmission shaft 52 is coaxially connected to the actuating shaft 45.

Next, effects of the first embodiment of multi-plate clutch is described.

The outer circumference of the assist cam 24, which constitutes the assist cam mechanism 23 by cooperating with the center cam 22 fixed to the main shaft 11, is splined to the inner circumference of the cylindrical portion 18a of the clutch inner member 18 so as to move in the axial direction relative to the clutch inner member 18.

The outer circumference of the slipper cam 26, which constitutes the back torque limiter mechanism 25 by cooperating with the center cam 22, is splined to the inner circumference of the cylindrical portion 18a so that at least the axial motion of the slipper cam 26 relative to the clutch inner member 18 away from the disc portion 22b of the center cam 22 will be limited.

Accordingly, the assist cam 24 and the slipper cam 26 can be connected to the clutch inner member 18 without bolts so as not to rotate relative to the clutch inner member. Thus, the number of components, and the cost of the multi-plate clutch 14 can be reduced by not using bolts. Also, the weight of the multi-plate clutch 14 can be reduced.

Splining the assist cam 24 and the slipper cam 26 to the cylindrical portion 18a of the clutch inner member 18, as described above, makes it possible to distribute the torque acting on the clutch inner member 18 from the assist cam 24 and the slipper cam 26. Accordingly, sufficient strength can be ensured in the clutch inner member 18 in spite of the fact that it is formed by casting. Thus, the cost can be reduced.

Since the outer circumference of the collar member 43 disposed between the assist cam 24 and the slipper cam 26 is splined to the inner circumference of the cylindrical portion 18a of the clutch inner member 18, efficiency of assembling the multi-plate clutch can be improved by splining the assist cam 24, the collar member 43, and the slipper cam 26 to the cylindrical portion 18a of the clutch inner member 18 in an order.

The clutch inner member 18, the pressure-receiving plate 21 arranged opposed to the pressure-applying plate portion 18b of the clutch inner member 18 with the multiple driving and driven friction plates 19, 19 ... and 20, 20 ... interposed therebetween, the assist cam 24, the slipper cam 26, and the disc spring 33 can be attached to the center cam 22 as one unit. Accordingly, the assembly efficiency of the multi-plate clutch 14 can be improved.

Since the assist cam 24 and the slipper cam 26 are formed of the identical material in the identical shape and size, the cost can be further reduced by interchangeably using the same components as both the assist cam 24 and the slipper cam 26.

Figure 4:
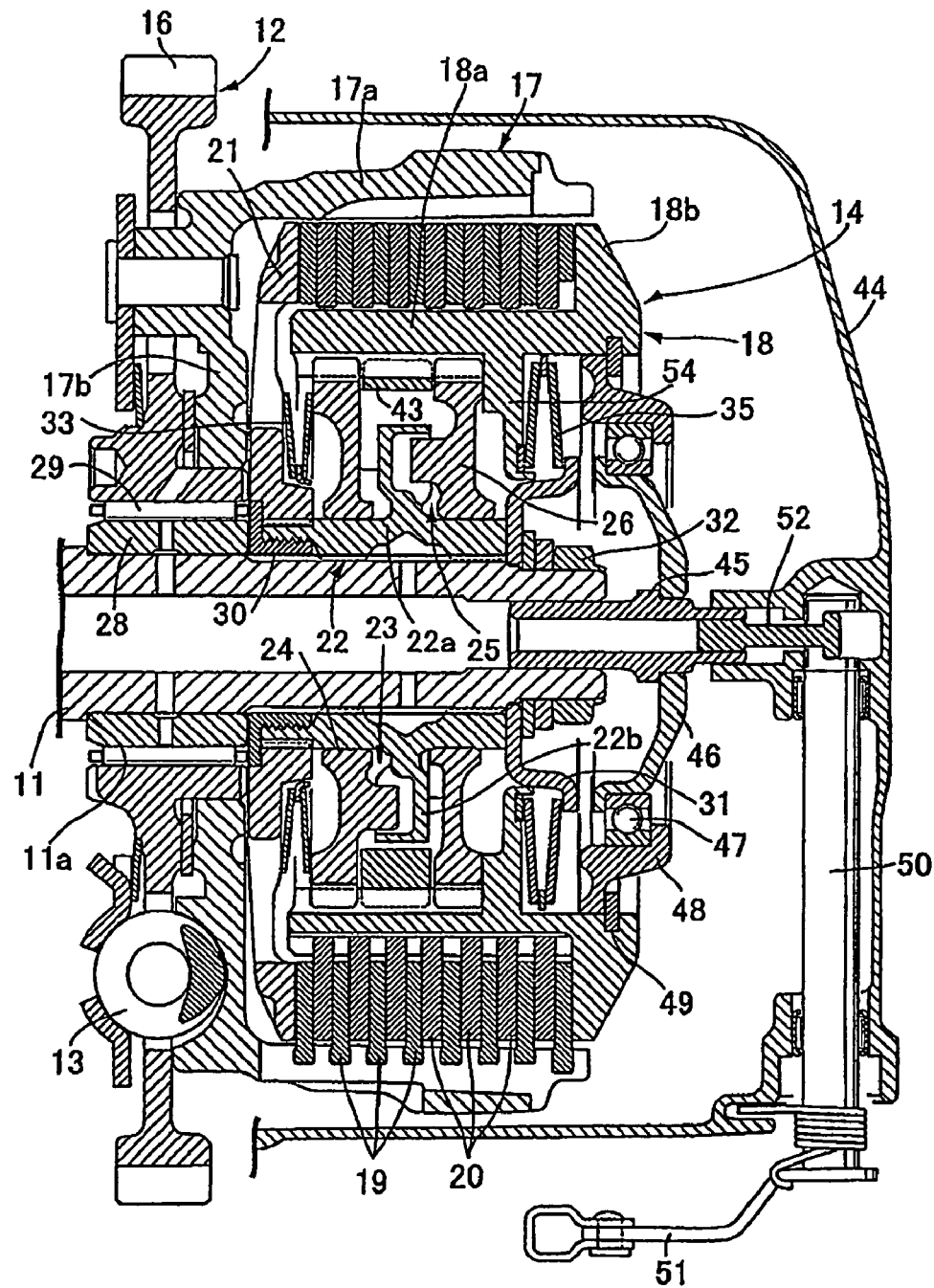
FIG. 4 is a cross-sectional view of a multi-plate clutch according to a second embodiment of the present invention.

According to a second embodiment of the present invention, as shown in FIG. 4, instead of the spring retainer 34 of the first embodiment, a stopper 54 which limits the axial motion of the slipper cam 26 relative to the clutch inner member 18 away from the disc portion 22b of the center cam 22 may be formed integrally with the clutch inner member 18 so as to protrude inward in the radial direction from the inner circumference of the cylindrical portion 18*a* of the clutch inner member 18. This makes it possible to limit the axial motion of the slipper cam 26 without increasing the number of components.

As an alternative embodiment of the present invention, the outer circumference of the slipper cam 26 may be press-fitted to the inner circumference of the cylindrical portion 18*a* of the clutch inner member 18 while being splined thereto. This makes it possible to fix the slipper cam 26 to the clutch inner member 18 without increasing the number of components.

While the embodiments of the present invention have been described above, the present invention is not limited to the above-described embodiments. Various design modifications can be made without departing from the range of the present invention as defined in the scope of claims.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A multi-plate clutch comprising:
a clutch outer member connected to an input member;
a clutch inner member having a cylindrical portion and a pressure-applying plate portion, the cylindrical portion being coaxially disposed in the clutch outer member, and the pressure-applying plate portion being arranged integrally with one end of the cylindrical portion;
a pressure-receiving plate fixed to an output member, and arranged opposite to the pressure-applying plate portion such that a plurality of driving friction plates and a plurality of driven friction plates interposed therebetween, wherein the plurality of driving friction plates are engaged with the clutch outer member so as not to rotate relative thereto, and the plurality of driven friction plates are engaged with the clutch inner member so as not to rotate relative thereto;
a center cam having a disc portion disposed in a plane orthogonal to a rotation axis of the output member, the center cam being disposed inward in a radial direction of the cylindrical portion, and is fixed to the output member;
an assist cam arranged opposite to one surface of the disc portion, and being operable to move the pressure-applying plate portion toward the pressure-receiving plate based an increase in driving force inputted from the input member; and
a slipper cam arranged opposite to the other surface of the disc portion, and being operable to move the pressure-applying plate portion away from the pressure-receiving plate in accordance with an increase in back torque from the output member,
wherein the assist cam and the slipper cam are formed of an identical material, and have substantially identical shapes;
an outer circumference of the assist cam is splined to an inner circumference of the cylindrical portion of the clutch inner member such that the assist cam is operable to move in an axial direction relative to the clutch inner member; and
an outer circumference of the slipper cam is splined to the inner circumference of the cylindrical portion of the clutch inner member such that at least an axial motion of the slipper cam relative to the clutch inner member away from the disc portion is limited.

2. The multi-plate clutch according to claim 1, wherein
the assist cam and the slipper cam have protrusions respectively inserted into recesses formed in both surfaces of the disc portion of the center cam; and
both sides of each of the protrusions are formed at angles so as to come into contact with side surfaces of a corresponding one of the recesses.

3. The multi-plate clutch according to claim 1, further comprising a stopper formed integrally with the clutch inner member, wherein said stopper is configured to limit the axial motion of the slipper cam relative to the clutch inner member away from the disc portion of the center cam.

4. The multi-plate clutch according to claim 3, wherein
the assist cam and the slipper cam have protrusions respectively inserted into recesses provided in both surfaces of the disc portion of the center cam; and
both sides of each of the protrusions are formed at angles so as to come into contact with side surfaces of a corresponding one of the recesses.

5. The multi-plate clutch according to claim 1, wherein the outer circumference of the slipper cam is press-fitted to the inner circumference of the cylindrical portion of the clutch inner member and is also splined thereto.

6. The multi-plate clutch according to claim 5, wherein
the assist cam and the slipper cam have protrusions respectively inserted into recesses formed in both surfaces of the disc portion of the center cam; and
both sides of each of the protrusions are formed at angles so as to come into contact with side surfaces of a corresponding one of the recesses.

7. The multi-plate clutch according to claim 1, further comprising a collar member having an outer circumference thereof splined to the inner circumference of the cylindrical portion of the clutch inner member; and
wherein the collar member is interposed between the assist cam and the slipper cam to surround the center cam so that a minimum distance between the assist cam and the slipper cam is limited.

8. The multi-plate clutch according to claim 7, wherein
the assist cam and the slipper cam have protrusions respectively inserted into recesses formed in both surfaces of the disc portion of the center cam; and
both sides of each of the protrusions are formed at angles so as to come into contact with side surfaces of a corresponding one of the recesses.

9. A multi-plate clutch comprising:
a clutch outer member connected to an input member, which is operatively connected with a crankshaft of an engine;
a clutch inner member having a cylindrical portion and a pressure-applying plate portion, the cylindrical portion being coaxially disposed in the clutch outer member, and the pressure-applying plate portion being arranged integrally with one end of the cylindrical portion;

a pressure-receiving plate fixed to an output member and arranged opposite to the pressure-applying plate portion with a plurality of driving friction plates and a plurality of driven friction plates interposed therebetween, the plurality of driving friction plates being engaged with the clutch outer member so as not to rotate relative thereto, the plurality of driven friction plates being engaged with the clutch inner member so as not to rotate relative thereto;

a center cam having a disc portion disposed in a plane orthogonal to a rotation axis of the output member, the center cam being disposed inward in a radial direction of the cylindrical portion and is fixed to the output member;

an assist cam disposed opposite to one surface of the disc portion, and being operable to move the pressure-applying plate portion toward the pressure-receiving plate based on an increase in driving force inputted from the input member; and a slipper cam disposed opposite to the other surface of the disc portion, and being operable to move the pressure-applying plate portion away from the pressure-receiving plate based on an increase in back torque from the output member;

a spring retainer disposed on the clutch inner member;

wherein the assist cam and the slipper cam are formed of an identical material, and have substantially identical shapes;

an outer circumference of the assist cam is splined to an inner circumference of the cylindrical portion of the clutch inner member so that the assist cam is operable to move in an axial direction relative to the clutch inner member;

an outer circumference of the slipper cam is splined to the inner circumference of the cylindrical portion of the clutch inner member so that at least an axial motion of the slipper cam relative to the clutch inner member away from the disc portion of the center cam is limited; and wherein said spring retainer is configured to restrict the axial motion of the slipper cam relative to the clutch inner member away from the disc portion of the center cam.

10. A multi-plate clutch according to claim 9, wherein the assist cam and the slipper cam have protrusions respectively inserted into recesses formed in both surfaces of the disc portion of the center cam, and both sides of each of the protrusions are formed at angles so as to come into contact with side surfaces of a corresponding one of the recesses.

11. A multi-plate clutch according to claim 9, wherein the outer circumference of the slipper cam is press-fitted to the inner circumference of the cylindrical portion of the clutch inner member and is also splined thereto.

12. A multi-plate clutch according to claim 11, wherein the assist cam and the slipper cam have protrusions respectively inserted into recesses formed in both surfaces of the disc portion of the center cam, and both sides of each of the protrusions are formed at angles so as to come into contact with side surfaces of a corresponding one of the recesses.

13. A multi-plate clutch according to claim 9, further comprising a collar member having an outer circumference splined to the inner circumference of the cylindrical portion of the clutch inner member, and wherein the collar member is interposed between the assist cam and the slipper cam to surround the center cam so that a minimum distance between the assist cam and the slipper cam is limited.

14. A multi-plate clutch according to claim 13, wherein the assist cam and the slipper cam have protrusions respectively inserted into recesses provided in both surfaces of the disc portion of the center cam, and both sides of each of the protrusions are formed at angles so as to come into contact with side surfaces of a corresponding one of the recesses.

15. A multi-plate clutch comprising:

a clutch outer member connected to an input member operatively connected with a crankshaft of an engine;

a clutch inner member having a cylindrical portion and a pressure-applying plate portion, the cylindrical portion being coaxially disposed in the clutch outer member, and the pressure-applying plate portion being arranged integrally with one end of the cylindrical portion;

a pressure-receiving plate fixed to an output member, and arranged opposite to the pressure-applying plate portion with a plurality of driving friction plates and a plurality of driven friction plates interposed therebetween, wherein the plurality of driving friction plates are engaged with the clutch outer member so as not to rotate relative thereto, and the plurality of driven friction plates are engaged with the clutch inner member so as not to rotate relative thereto;

a center cam having a disc portion disposed in a plane orthogonal to a rotation axis of the output member, the center cam being disposed inward in a radial direction of the cylindrical portion and is fixed to the output member;

an assist cam arranged opposite to one surface of the disc portion, and being operable to move the pressure-applying plate portion toward the pressure-receiving plate in accordance with an increase in driving force inputted from the input member; and a slipper cam arranged opposite to the other surface of the disc portion, and being operable to move the pressure-applying plate portion away from the pressure-receiving plate in accordance with an increase in back torque from the output member;

a stopper member disposed on the clutch inner member;

wherein the assist cam and the slipper cam are formed of an identical material, and wherein a size and a shape of the assist cam is substantially similar to a size and a shape of the slipper cam;

an outer circumference of the assist cam is splined to an inner circumference of the cylindrical portion of the clutch inner member so that the assist cam is operable move in an axial direction relative to the clutch inner member;

an outer circumference of the slipper cam is splined to the inner circumference of the cylindrical portion of the clutch inner member so that at least an axial motion of the slipper cam relative to the clutch inner member away from the disc portion of the center cam is limited; and wherein said stopper member is configured to restrict the axial motion of the slipper cam relative to the clutch inner member away from the disc portion of the center cam.

16. A multi-plate clutch according to claim 15, wherein the outer circumference of the slipper cam is press-fitted to the inner circumference of the cylindrical portion of the clutch inner member, and is also splined thereto.

17. A multi-plate clutch according to claim 15, further comprising a collar member having an outer circumference splined to the inner circumference of the cylindrical portion of the clutch inner member, and wherein the collar member is interposed between the assist cam and the slipper cam to surround the center cam so that a minimum distance between the assist cam and the slipper cam is limited.

18. A multi-plate clutch according to claim 15, wherein
the assist cam and the slipper cam have protrusions respectively inserted into recesses formed in both surfaces of the disc portion of the center cam, and
both sides of each of the protrusions are formed at angles so as to come into contact with side surfaces of a corresponding one of the recesses.

19. A multi-plate clutch according to claim 15, wherein said stopper member is one of a retainer spring disposed on the clutch inner member, and a stopper integrally formed on the clutch inner member.

20. A multi-plate clutch according to claim 19, wherein
the assist cam and the slipper cam have protrusions respectively inserted into recesses formed in both surfaces of the disc portion of the center cam, and
both sides of each of the protrusions are formed at angles so as to come into contact with side surfaces of a corresponding one of the recesses.

* * * * *